(No Model.)
N. A. OTTO.
MOTOR ENGINE WORKED BY THE COMBUSTION OF SPRAY OF PETROLEUM.
No. 407,234. Patented July 16, 1889.
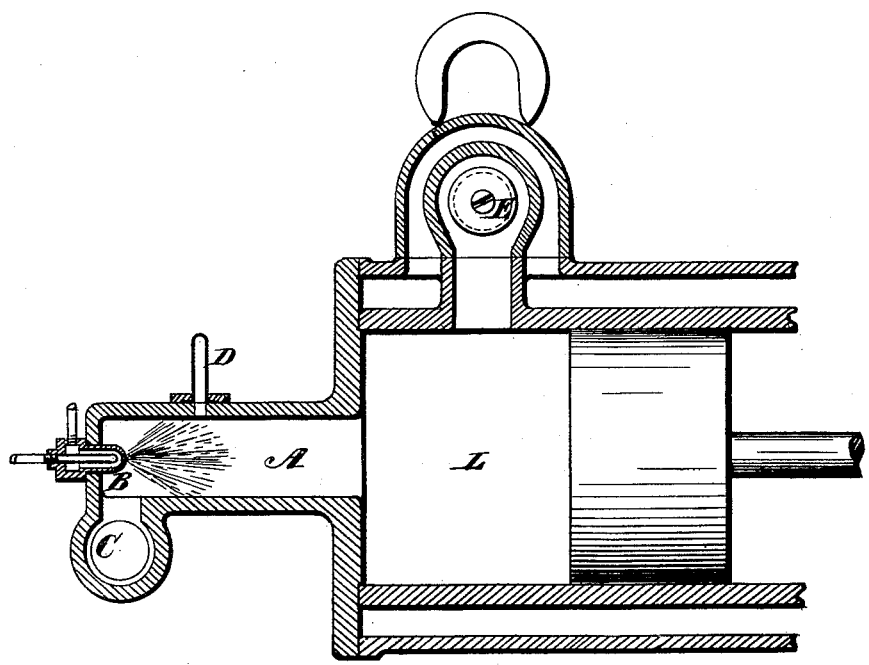
Witnesses:
Robt Garrett
J. A. Rutherford
Inventor:
Nicolaus A. Otto.
By James L. Norris
Atty.

UNITED STATES PATENT OFFICE.

NICOLAUS AUGUST OTTO, OF COLOGNE, PRUSSIA, ASSIGNOR TO THE GAS-MOTOREN-FABRIK-DEUTZ, OF DEUTZ-ON-THE-RHINE, GERMANY.

MOTOR-ENGINE WORKED BY THE COMBUSTION OF SPRAY OF PETROLEUM.

SPECIFICATION forming part of Letters Patent No. 407,234, dated July 16, 1889.

Application filed May 23, 1888. Serial No. 274,820. (No model.) Patented in England April 17, 1888, No. 5,724; in Belgium April 27, 1888, No. 81,583; in France June 2, 1888, No. 190,979; in Italy June 23, 1888, XLVI, 216; in Spain August 20, 1888, No. 8,265, and in Austria-Hungary September 16, 1888, No. 18,301 and No. 34,374.

*To all whom it may concern:*

Be it known that I, NICOLAUS AUGUST OTTO, a citizen of Prussia, residing at Cologne, in the Empire of Germany, have invented new and useful Improvements in Motor-Engines Worked by the Combustion of Spray of Petroleum or other Combustible Liquids, (for which I have obtained patents in Great Britain, dated April 17, 1888, No. 5,724; Belgium, dated April 27, 1888, No. 81,583; France, dated June 2, 1888, No. 190,979; Italy, dated June 23, 1888, Vol. XLVI, No. 216; Austria-Hungary, dated September 16, 1888, No. 18,301 and No. 34,374, and Spain, dated August 20, 1888, No. 8,265,) of which the following is a specification.

This invention relates to motor-engines wherein spray of petroleum or other combustible liquid, together with air, is introduced into a charging-space in the engine-cylinder, so as on being there ignited to expand and propel the piston.

According to the present improvement, instead of effecting the spraying of the petroleum, the admixture therewith of air, and the ignition of the combustible mixture thus produced in the said charging-space of the cylinder itself, these operations are effected in a passage of comparatively small sectional area leading into the cylinder.

It is well known that there are considerable difficulties attendant on the certain ignition of a mixture of sprayed or vaporized petroleum and air and its useful employment for driving motor-engines. It is necessary for this purpose to heat the combustible mixture in the first instance to a considerable extent, for which purpose the charging-chamber of the cylinder has to be heated, or to be maintained in a heated condition, and this sometimes leads to the overheating of the cylinder, causing premature ignition of the combustible charges. Furthermore, the residual combustion products from the previous explosion remaining in the charging-space of the cylinder effects the dilution of the combustible mixture, and the greater this dilution is the more is it necessary to heat the cylinder, thus tending to produce premature explosions, as explained. On the other hand, the less the dilution of the charge the more easily and rapidly is its ignition effected and the less heating of the charging-chamber is required. By effecting the spraying of the petroleum its admixture with air and ignition in a comparatively narrow passage leading into the cylinder, instead of in the cylinder itself, according to the present invention, the above described difficulties are obviated, as the air introduced into the said passage for admixture with the spray drives the products of combustion from the same into the cylinder, so that the portion of the combustible charge contained in this passage remains practically undiluted as compared with that portion which passes into the charging-space of the cylinder, and even on the compression of the charge the composition of the portion in the passage remains practically unchanged. Furthermore, by so forming the said passage that it projects to a great extent from the cylinder it is capable of being readily heated to a certain degree without unduly heating the cylinder itself, and, as the combustible mixture contained in the passage is practically undiluted, its ignition will be effected with certainty with only a moderate preliminary heating, which precludes premature ignition. The arrangement of the said passage and means for introducing the petroleum in the form of spray therein and mixing it with air can be variously modified. Thus the passage may either project centrally from the cylinder-cover or it may project from the side of the cylinder, and be so arranged that the combustible mixture on passing from it into the cylinder comes in contact with either the hot sides of the latter or with a specially-heated plate. The cylinder may either be entirely cooled by water circulation, as heretofore, or the charging-space may be left partly uncooled. The spraying of the combustible-liquid may be effected by an injector-spraying apparatus of known construction arranged at the end of the said passage, into which the necessary air for admixture with the spray is introduced through a lateral opening controlled by a valve. The ignition of the charge in the said passage may either be effected by an externally-heated igniting-tube of known construction or by an electric spark, or by any other known means.

The accompanying drawing shows, by way of example, a part longitudinal section of a petroleum motor-engine, in which L is the charging-chamber for containing the compressed combustible charge prior to ignition.

A is the before-mentioned passage, which is formed by a tubular extension projecting centrally from the cylinder-cover, and provided at its end with an injector spraying apparatus B of known construction, through which the petroleum spray is introduced, the requisite air-supply being introduced through the valve C.

D is the externally-heated tube opening into the tubular extension for igniting the combustible charge, and E indicates the exhaust-valve.

I am aware of English patent to Siemens, No. 2,074 of the year 1860, and while it describes a passage or chamber containing an externally-heated firing-tube, and through which heated mixture of petroleum-vapor and air is introduced directly into the cylinder, still such patent does not disclose what is now known as a "gas" or "oil" motor-engine—that is, an engine in which a combustible gaseous charge is first introduced entirely into the cylinder with or without compression, and is then fired. On the contrary, the patent describes a different type of engine, in that the combustible mixture is ignited by the firing-tube from the moment that the first portion issues into the cylinder to the end of the charge in a continuous stream. I therefore disclaim the features described in the patent alluded to as not of my invention.

Having thus described the nature of this invention and the best means I know for carrying the same into practical effect, I claim—

1. The combination, with the cylinder and piston of a petroleum motor-engine, which operates with combustible charges that are first introduced and compressed within the cylinder and subsequently fired, of a tubular extension projecting from the end of the cylinder of less sectional area than the latter, containing inlets for petroleum and air, and means for heating the tubular extension externally by an independent source of heat, said tubular extension being made to communicate directly and of its full sectional area with the cylinder, so that the mixture of petroleum and air as it enters the said tubular extension and becomes heated shall pass in a vaporized condition freely into the cylinder to be compressed therein, substantially as herein described.

2. The combination, with the cylinder and piston of a petroleum motor-engine, which operates with combustible charges that are compressed within the cylinder and subsequently fired, of a tubular extension projecting from the end of the cylinder of less sectional area than the latter, containing inlets for petroleum and air, and an externally-heated igniting-tube, and means for heating the tubular extension externally by an independent source of heat, said tubular extension being made to communicate directly and of its full sectional area with the cylinder, so that the mixture of petroleum and air as it enters the said tubular extension and becomes heated shall first pass freely into the cylinder, so as to be compressed by the instroke of the piston, and shall then be ignited within the tubular extension by the heated igniting-tube, substantially as herein described.

3. In a petroleum motor-engine, the combination, with the engine-cylinder, of a tubular extension thereon communicating at one end freely with the cylinder, and having at the other end an inlet for petroleum-spray and air, and heated externally by a suitable heating device, substantially as described.

In testimony whereof I have signed my name to this specification, in the presence of two subscribing witnesses, this 1st day of May, A. D. 1888.

NICOLAUS AUGUST OTTO.

Witnesses:
W. L. ALDEN,
CHARLES M. WOOD.